(12) United States Patent
Cai et al.

(10) Patent No.: US 11,150,132 B2
(45) Date of Patent: Oct. 19, 2021

(54) GRATING ROTATION METHOD AND APPARATUS FOR IMPROVING SPECTROGRAPH WAVELENGTH ACCURACY

(71) Applicant: Zolix Instruments Co., Ltd., Beijing (CN)

(72) Inventors: Hongtai Cai, Beijing (CN); Haixia Chen, Beijing (CN)

(73) Assignee: Zolix Instruments Co., Ltd., Beijing (CN)

( * ) Notice: Subject to any disclaimer, the term of this patent is extended or adjusted under 35 U.S.C. 154(b) by 0 days.

(21) Appl. No.: 16/872,856

(22) Filed: May 12, 2020

(65) Prior Publication Data

US 2021/0199502 A1 Jul. 1, 2021

(30) Foreign Application Priority Data

Dec. 26, 2019 (CN) .......................... 201911364322.3

(51) Int. Cl.
*G01J 3/18* (2006.01)
*G01J 3/02* (2006.01)
*G01J 3/06* (2006.01)

(52) U.S. Cl.
CPC ............... *G01J 3/18* (2013.01); *G01J 3/027* (2013.01); *G01J 3/0278* (2013.01); *G01J 3/06* (2013.01); *G01J 2003/069* (2013.01)

(58) Field of Classification Search
CPC ............... G01J 3/18; G01J 3/027; G01J 3/06
See application file for complete search history.

(56) References Cited

U.S. PATENT DOCUMENTS 4,469,441 A * 9/1984 Bernier ............... G01J 3/06
356/316
10,215,635 B2 * 2/2019 Workman, Jr. ....... G01J 3/0289
(Continued)

FOREIGN PATENT DOCUMENTS

CN 203949873 U 11/2014
CN 104501954 A 4/2015
(Continued)

OTHER PUBLICATIONS

Haoyu Li, "New wavelength-fitting algorithm of CCD in the circumstance of grating rotation", Jul. 17, 2014 (Year: 2014).*
(Continued)

*Primary Examiner* — Maurice C Smith
(74) *Attorney, Agent, or Firm* — Nutter McClennen & Fish LLP (57) ABSTRACT

The present disclosure provides a grating rotation method and apparatus for improving spectrograph wavelength accuracy. The grating rotation method comprises: acquiring a start wavelength and an end wavelength of a scanning range; determining a start angle and an end angle of a grating rotation according to preset grating rotation angle series values, the start wavelength and the end wavelength, wherein a wavelength corresponding to the start angle is smaller than the start wavelength, and a wavelength corresponding to the end angle is larger than the end wavelength; and rotating the grating according to the start angle and the end angle to obtain required spectral information. According to the grating rotation scheme provided by the present disclosure, the problem that the obtained spectral accuracy is inconsistent due to different grating rotation angles can be avoided.

12 Claims, 6 Drawing Sheets

(56) References Cited

U.S. PATENT DOCUMENTS

| | | | |
|---|---|---|---|
| 2007/0258091 A1* | 11/2007 | Hammer | .................. G01J 3/06 356/334 |
| 2015/0308892 A1 | 10/2015 | Feng et al. | |
| 2018/0088036 A1 | 3/2018 | Schleifenbaum et al. | |
| 2019/0145799 A1 | 5/2019 | Guggenmos et al. | |

FOREIGN PATENT DOCUMENTS

| | | |
|---|---|---|
| CN | 107870151 A | 4/2018 |
| CN | 109416264 A | 3/2019 |
| EP | 0882963 A2 | 12/1998 |

OTHER PUBLICATIONS

Office Action in Chinese Patent Application No. 201911364322.3, dated Jul. 5, 2021, 12 pages (6 pages of English translation).
Search Report for Chinese Patent Application No. 201911364322.3 dated Jun. 28, 2021, 6 pages (2 pages of English translation).

\* cited by examiner

GRATING ROTATION METHOD AND APPARATUS FOR IMPROVING SPECTROGRAPH WAVELENGTH ACCURACY

CROSS REFERENCE TO RELATED APPLICATIONS

This application claims priority from China Application Number 201911364322.3, filed on Dec. 26, 2019, the subject matter of which is incorporated herein by reference.

TECHNICAL FIELD

The present disclosure belongs to the field of optical technologies, and in particular to a grating rotation method and apparatus for improving spectrograph wavelength accuracy.

BACKGROUND

The grating scanning spectrograph disperses the composite light into a spectral band through the grating and projects the spectral band onto an array detector. The array detector can detect spectral information with a certain wavelength width at a time, then rotate the grating to obtain spectral information with a certain wavelength width, and finally splice these spectral information to obtain spectral information with an ultra-long wavelength width. However, the current grating scanning spectrograph always has a problem in the wavelength accuracy and is restricted in some high-accuracy tests. In the prior arts, the array detector of the grating scanning spectrograph only collects one section of spectrum at a time. If the ultra-long width spectrum should be scanned and collected, the grating needs to be rotated several times to collect the information of each section of spectrum, and then such information is spliced. The grating rotation scheme in the prior spectrometer is to divide and calculate the angle of each grating rotation according to the start wavelength and the end wavelength set by the user. For example, if the scanning range is Δλ at a time and the start wavelength is λ1, the wavelength division and grating rotation scheme is to scan for λ1+Δλ for the first time, scan for λ1+2Δλ for the second time, scan for λ1+3Δλ for the third time, . . . , until the scanning reaches the end scanning wavelength set by the user. However, the disadvantage of this scheme is that if the start wavelength varies, the angle of each grating rotation in the spectrometer is also different, which easily affects the accuracy of the final result.

SUMMARY

The present disclosure provides a grating rotation method and apparatus for improving spectrograph wavelength accuracy, so as to at least solve the problem in the prior arts that the spectral information results obtained by the existing grating rotation scheme are inaccurate due to the low wavelength accuracy of a grating scanning spectrograph.

According to an aspect of the present disclosure, there is provided a grating rotation method for improving spectrograph wavelength accuracy, comprising:

acquiring a start wavelength and an end wavelength of a scanning range;

determining a start angle and an end angle of a grating rotation according to preset grating rotation angle series values, the start wavelength and the end wavelength, wherein a wavelength corresponding to the start angle is smaller than the start wavelength, and a wavelength corresponding to the end angle is larger than the end wavelength; and rotating the grating according to the start angle and the end angle to obtain required spectral information.

In one embodiment, determining a start angle and an end angle of a grating rotation according to preset grating rotation angle series values, the start wavelength and the end wavelength comprises:

determining a first wavelength smaller than and closest to the start wavelength among wavelengths corresponding to the preset grating rotation angle series values, wherein an angle corresponding to the first wavelength is the start angle;

determining a second wavelength larger than and closest to the end wavelength among the wavelengths corresponding to the preset grating rotation angle series values, wherein an angle corresponding to the second wavelength is the end angle.

In one embodiment, rotating the grating according to the start angle and the end angle to obtain required spectral information comprises:

rotating the grating from the start angle to the end angle to acquire spectra at a plurality of rotation angles;

splicing all the spectra to obtain full-range spectral information; and intercepting required spectral information from the full-range spectral information according to the start wavelength and the end wavelength.

In one embodiment, presetting the grating rotation angle series values comprises:

presetting the grating rotation angle series values according to index attributes of the grating and a spectral capture wavelength width of an array detector, wherein among the grating rotation angle series values, spectral ranges photographed by the array detector have an overlapped area at two adjacent grating rotation angle values.

In one embodiment, the grating rotation method further comprises:

testing wavelengths corresponding to different grating rotation angles, and generating a mapping relation table of the grating rotation angles and the corresponding wavelengths.

According to another aspect of the present disclosure, there is further provided a grating rotating apparatus for improving spectrograph wavelength accuracy, comprising:

an acquisition unit configured to acquire a start wavelength and an end wavelength of a scanning range;

a start and end angle determination unit configured to determine a start angle and an end angle of a grating rotation according to preset grating rotation angle series values, the start wavelength and the end wavelength, wherein a wavelength corresponding to the start angle is smaller than the start wavelength, and a wavelength corresponding to the end angle is larger than the end wavelength; and a spectral information acquisition unit configured to rotate the grating according to the start angle and the end angle to obtain required spectral information.

In one embodiment, the start and end angle determination unit comprises:

a start angle determination module configured to determine a first wavelength smaller than and closest to the start wavelength among wavelengths corresponding to the preset grating rotation angle series values, wherein an angle corresponding to the first wavelength is the start angle; and an end angle determination module configured to determine a second wavelength larger than and closest to the end wavelength among the wavelengths corresponding to the preset grating rotation angle series values, wherein an angle corresponding to the second wavelength is the end angle.

In one embodiment, the spectral information acquisition unit comprises:

a spectrum acquisition module configured to rotate the grating from the start angle to the end angle to acquire spectra at a plurality of rotation angles;

a splicing module configured to splice all the spectra to obtain full-range spectral information; and an interception module configured to intercept required spectral information from the full-range spectral information according to the start wavelength and the end wavelength.

In one embodiment, means for presetting the grating rotation angle series values comprise:

an angle series values setting module configured to preset the grating rotation angle series values according to index attributes of the grating and a spectral capture wavelength width of an array detector; wherein among the grating rotation angle series values, spectral ranges photographed by the array detector have an overlapped area at two adjacent grating rotation angle values.

In one embodiment, the grating rotating apparatus further comprises:

a mapping relation generation unit configured to test wavelengths corresponding to different grating rotation angles, and generate a mapping relation table of the grating rotation angles and the corresponding wavelengths.

In the present disclosure, a series of fixed grating rotation angles are set according to different gratings and the spectral capture wavelength width of the array detector; next, the spectral information is scanned and spliced according to the preset grating rotation angles; and data is selected and discarded according to a wavelength scanning range set by a user to realize the wavelength scanning range set by the user, thereby achieving the purpose of improving the wavelength accuracy in the wavelength scanning range according to the set fixed grating rotation angles.

BRIEF DESCRIPTION OF THE DRAWINGS

In order to more clearly explain the technical solutions in the embodiments of the present disclosure or in the prior arts, the drawings to be used in the description of the embodiments or the prior arts will be briefly introduced as follows. Obviously, the following drawings only illustrate some embodiments of the present disclosure, and those of ordinary skill in the art can obtain other drawings from them without paying any creative labor.

DETAILED DESCRIPTION OF THE PREFERRED EMBODIMENTS

Next, the technical solutions in the embodiments of the present disclosure will be described clearly and completely with reference to the drawings of the embodiments of the present disclosure. Obviously, those described are merely parts, rather than all, of the embodiments of the present disclosure. Based on these embodiments of the present disclosure, any other embodiment obtained by those of ordinary skill in the art without paying any creative labor should fall within the scope of the present disclosure.

At present, the following spectrographs (spectrometers) are available in the market:

1. The spectrograph, i.e., a spectrometer that disperses the composite light into a spectral band through a grating and projects the spectral band onto an array detector. The array detector can detect spectral information with a certain wavelength width at a time, and the wavelength range is fixed.

2. The grating scanning slit spectrometer, i.e., a spectrometer that disperses the composite light into a spectral band through a grating, and then selects monochromatic light of a certain wavelength through a slit, that is, monochromatic light of one wavelength can only be obtained each time. If spectrometer information of a certain wavelength width needs to be obtained, the grating needs to be rotated for scanning.

3. The grating scanning spectrograph, which disperses the composite light into a spectral band through a grating and projects the spectral band onto an array detector. The array detector can detect spectral information with a certain wavelength width at a time, then rotate the grating to obtain spectral information with a certain wavelength width, and finally splice these spectral information to obtain spectral information with an ultra-long wavelength width.

Figure 1A:
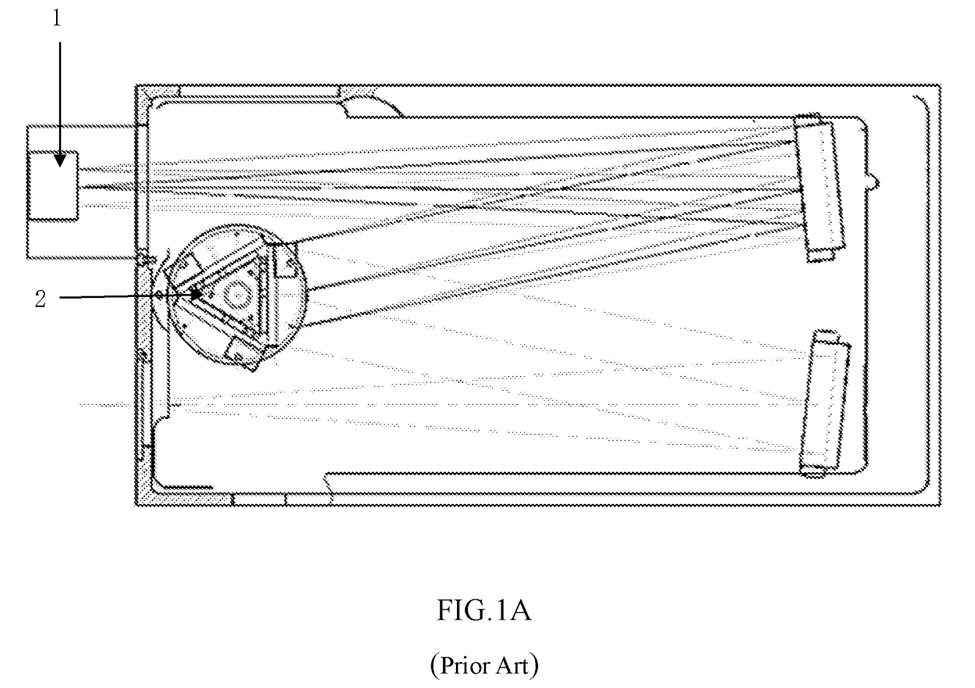
FIG. 1A is a schematic principle diagram of a grating scanning spectrograph.

As combining the advantages of the spectrograph and the grating scanning slit spectrometer, the grating scanning spectrograph attracts more and more attention in the applications and is increasingly widely applied. The research of the present disclosure is mainly based on the grating scanning spectrograph, and its principle diagram is illustrated in FIG. 1A, including an array detector 1 and a rotatable grating 2. However, the current grating scanning spectrograph always has a problem in the wavelength accuracy and is restricted in some high-accuracy tests. The main reason for this problem is the rotation scheme of the grating of the spectrometer, which generally divides and calculates the angle of each grating rotation according to the start wavelength and the end wavelength set by the user. That is, if the start wavelength varies, the angle of each grating rotation in the spectrometer is also different. For example, if the scanning range is $\Delta\lambda$ at a time and the start wavelength is $\lambda 1$, the wavelength division and grating rotation scheme is to scan for $\lambda 1+\Delta\lambda$ for the first time, scan for $\lambda 1+2\Delta\lambda$ for the second time, scan for $\lambda 1+3\Delta\lambda$ for the third time, . . . , until the scanning reaches the end scanning wavelength set by the user. Thus, if the start wavelength is inaccurate, the finally obtained spectral information is also inaccurate. The spectrum is collected at a time from $\lambda 1$ to $\lambda 1+\Delta\lambda$, and corresponding grating central wavelength is $\theta 1$; the spectrum is collected at a time from $\lambda 1+\Delta\lambda$ to $\lambda 1+2\Delta\lambda$, and corresponding grating central wavelength is $\theta 2$; and the spectrum is collected at a time from $\lambda 1+2\Delta\lambda$ to $\lambda 1+3\Delta\lambda$, and corresponding grating central wavelength is $\theta 3$. For example, when the grating central wavelength is 400 nm, the collected spectral range is from 375 to 425 nm; and when the grating central wavelength is 405 nm, the collected spectral range is from 380 to 430 nm. Due to the theoretical, mechanical and correction errors of the grating at different diffraction angles, the overlapping part of the spectral ranges is from 380 to 425 nm, and the accuracy of the overlapping part varies at the central wavelengths of two adjacent gratings.

Figure 1B:
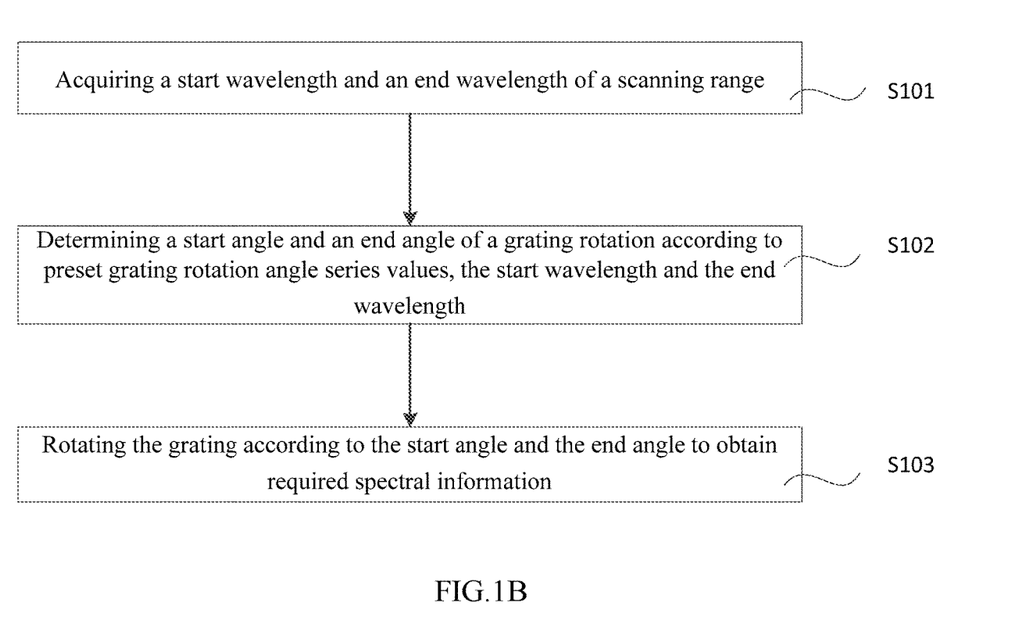
FIG. 1B is a flowchart of a grating rotation method for improving spectrograph wavelength accuracy provided by the present disclosure.

In order to solve the above problem, the present disclosure provides a grating rotation method for improving spectrograph wavelength accuracy, as illustrated in FIG. 1B, comprising the steps of:

S101: acquiring a start wavelength and an end wavelength of a scanning range.

The scanning range set by the user is acquired, and the scanning range is determined by the start wavelength and the end wavelength.

In a specific embodiment, if the scanning range set by the user is from $\lambda a$ to $\lambda b$, $\lambda a$ is the start wavelength and $\lambda b$ is the end wavelength.

S102: determining a start angle and an end angle of a grating rotation according to preset grating rotation angle series values, the start wavelength and the end wavelength, wherein a wavelength corresponding to the start angle is smaller than the start wavelength, and a wavelength corresponding to the end angle is larger than the end wavelength.

After the grating scanning spectrograph has undergone a wavelength correction in the full-range waveband, a series of fixed grating rotation angle values (grating rotation angle series values) are set according to different gratings and the spectral capture wavelength width of the array detector in the spectrograph. For example, the grating rotation angle values are preset as $A1, A2 \ldots, An$, and wavelengths corresponding to the n angle values are $\lambda 1, \lambda 2, \ldots, \lambda n$, respectively. The grating has a start angle of A1, and an end angle of An. A wavelength corresponding to the start angle is $\lambda 1$, and a wavelength corresponding to the end angle is $\lambda n$.

The start wavelength $\lambda a$ and the end wavelength $\lambda b$ obtained in S101 are calculated; the start wavelength $\lambda a$ and the end wavelength $\lambda b$ should be larger than the wavelength $\lambda 1$ corresponding to the start angle A1 of the grating, and the end wavelength $\lambda b$ should be smaller than the wavelength $\lambda n$ corresponding to the end angle An of the grating.

S103: rotating the grating according to the start angle and the end angle to obtain required spectral information.

According to the start angle and the end angle of the grating (i.e. the grating rotation angle series values) preset in S102, the grating is sequentially rotated, i.e. when the grating is rotated to a preset fixed value (angle) each time, the spectrum is photographed once, and when the grating is rotated to a next preset fixed value (angle), the spectrum is photographed again; all the spectra obtained by photographing are spliced and intercepted to obtain required spectral information.

The execution body of the flow illustrated in FIG. 1B may be a server, a PC and a mobile terminal. By fixing the grating rotation angle, the method realizes a function of accurately measuring the spectral information without considering the initial scanning wavelength value set by the user.

Figure 2:
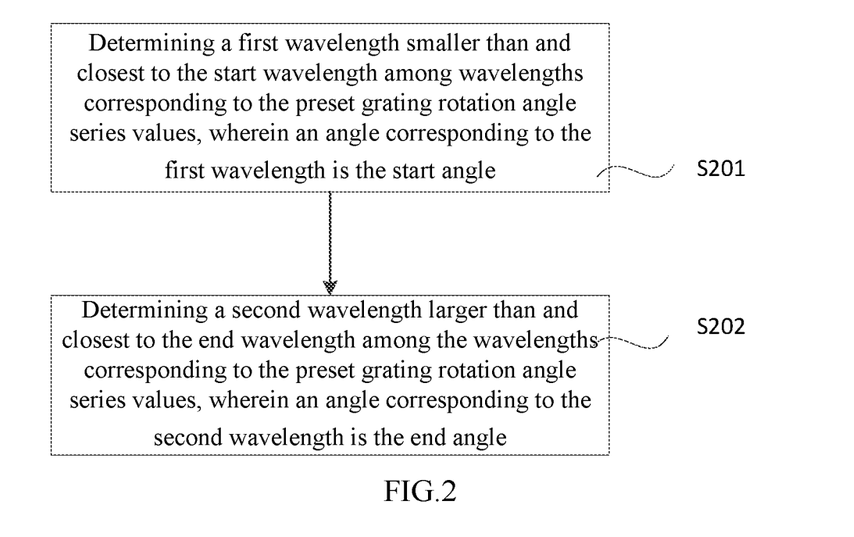
FIG. 2 is a flowchart of a method for determining a start angle and an end angle of a grating rotation according to preset grating rotation angle series values, a start wavelength and an end wavelength in an embodiment of the present disclosure.

In one embodiment, as illustrated in FIG. 2, determining a start angle and an end angle of a grating rotation according to preset grating rotation angle series values, the start wavelength and the end wavelength comprises:

S201: determining a first wavelength smaller than and closest to the start wavelength among wavelengths corresponding to the preset grating rotation angle series values, wherein an angle corresponding to the first wavelength is the start angle.

In a specific embodiment, still taking the example given in S101 to S103, the preset grating rotation angle series values are $A_1, A_2 \ldots, A_n$, and wavelengths corresponding to these angles are $\lambda 1, \lambda 2, \ldots, \lambda n$, respectively. The start wavelength and the end wavelength (i.e. the scanning range to be obtained) set by the user at an input end (such as a display, a keyboard, a PC, etc., and this scheme is not limited thereto) are $\lambda a$ and $\lambda b$, respectively. According to the start wavelength $\lambda a$ and the end wavelength $\lambda b$, if it is judged that they fall within a range of the wavelengths corresponding to the preset grating rotation angles, e.g., $\lambda a$ is between $\lambda j$ and $\lambda j+1$, then $\lambda j$ is the first wavelength smaller than and closest to the start wavelength $\lambda a$, and the angle corresponding to $\lambda a$ is the start angle of the grating rotation.

S202: determining a second wavelength larger than and closest to the end wavelength among the wavelengths corresponding to the preset grating rotation angle series values, wherein an angle corresponding to the second wavelength is the end angle.

In a specific embodiment, like the specific embodiment of S201, if the end wavelength $\lambda b$ preset by the user falls between $\lambda k$ and $\lambda k+1$, then $\lambda k+1$ larger than and closest to the end wavelength is the second wavelength, and the angle corresponding to $\lambda k+1$ is the end angle of the grating rotation.

Figure 3:
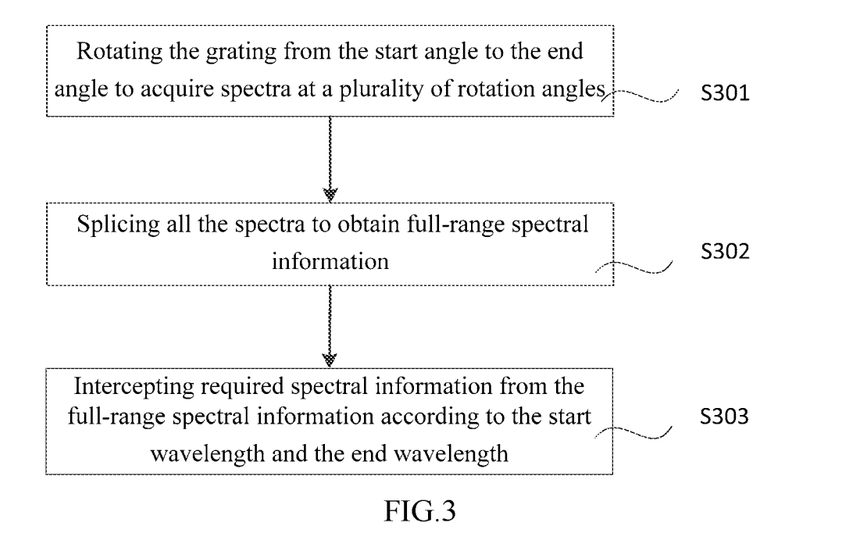
FIG. 3 is a flowchart of a method for obtaining required spectral according to a start angle and an end angle in an embodiment of the present disclosure.

In one embodiment, as illustrated in FIG. 3, rotating the grating according to the start angle and the end angle to obtain required spectral information comprises:

S301: rotating the grating from the start angle to the end angle to acquire spectra at a plurality of rotation angles.

In a specific embodiment, if the scanning range set by the user is from $\lambda a$ to $\lambda b$, and wavelengths corresponding to the preset grating rotation angle series values are $\lambda 1, \lambda 2, \ldots, \lambda n$, wherein $\lambda a$ is between $\lambda j$ and $\lambda j+1$, and $\lambda b$ is between $\lambda k$ and $\lambda k+1$, then when the grating is rotated, it starts to be rotated from $\lambda j$ so that a spectrum is photographed at $\lambda j$, rotated to $\lambda j+1$ so that a spectrum is photographed at $\lambda j+1$, rotated to $\lambda j+2$ so that a spectrum is photographed at $\lambda j+2$, and so on, until rotated to $\lambda k+1$ so that a spectrum is photographed at $\lambda k+1$, so as to acquire spectra at a plurality of rotation angles.

S302: splicing all the spectra to obtain full-range spectral information.

In a specific embodiment, the full-range spectral information can be obtained by splicing all the spectra at a plurality of rotation angles obtained in S301.

S303: intercepting required spectral information from the full-range spectral information according to the start wavelength and the end wavelength.

In a specific embodiment, after the full-range spectral information is obtained in step S302, according to the start wavelength and the end wavelength set by the user, a section from the start wavelength to the end wavelength is intercepted from the full-range spectral information as the spectral information required by the user.

In one embodiment, the step of presetting the grating rotation angle series values comprises:

presetting the grating rotation angle series values according to index attributes of the grating and a spectral capture wavelength width of an array detector, wherein among the grating rotation angle series values, spectral ranges photographed by the array detector have an overlapped area at two adjacent grating rotation angle values.

In a specific embodiment, a series of fixed grating rotation angles and their corresponding wavelengths, such as λ1, λ2, . . . , λn are set according to the index attributes of different gratings (including type, groove, spectral range, etc.) and the spectral capture wavelength width of the array detector. In addition, it should be ensured that at these grating rotation angles, two adjacent spectra photographed by the array detector can have a certain overlapped area at two adjacent grating rotation angles.

In one embodiment, the grating rotation method further comprises:

testing wavelengths corresponding to different grating rotation angles, and generating a mapping relation table of the grating rotation angles and the corresponding wavelengths.

In a specific embodiment, before the grating rotation, a series of grating rotation values need to be set according to the grating attributes and the spectral capture wavelength width of the array detector. These grating rotation values are all angles, and different angles are corresponding to different wavelengths. For example, the preset grating rotation angle series values are A1, A2 . . . , An, and their corresponding wavelengths are λ1, λ2, . . . , λn, respectively. Therefore, a mapping relation table of the grating rotation angle series values A (series) and the corresponding wavelengths λ (series) can be generated in advance.

In order to better understand the method described in FIGS. 1 to 3, the present disclosure gives the following examples:

According to the grating indexes and the spectral capture wavelength width of the array detector, a series of grating rotation angles are preset, each corresponding to a grating central wavelength. It is assumed that the grating central wavelengths corresponding to the series of grating rotation angles are 300, 350, 400, 450, 500, 550, 600, 650, 700, 750 and 800 nm.

It is assumed that the scanning range set by the user is from 360 to 720 nm (wavelength), when the spectra are scanned and collected, the grating is rotated to the angles corresponding to the central wavelengths of 350, 400, 450, 500, 550, 600, 650 and 700 nm, respectively, to collect and splice the spectra, and then spectral information other than 360 to 720 nm is removed.

It is assumed that the scanning range set by the user is from 365 to 710 nm (wavelength), when the spectra are scanned and collected, the grating is rotated to the angles corresponding to the central wavelengths of 350, 400, 450, 500, 550, 600, 650 and 700 nm, respectively, to collect and splice the spectra, and then spectral information other than 365 to 710 nm is removed.

It is assumed that the scanning range set by the user is from 440 to 620 nm (wavelength), when the spectra are scanned and collected, the grating is rotated to the angles corresponding to the central wavelengths of 450, 500, 550 and 600 nm, respectively, to collect and splice the spectra, and then spectral information other than 440 to 620 nm is removed.

As mentioned above, regardless of the scanning range set by the user, during the spectrum scanning and collection, the central wavelengths are always preset wavelength series (in practice, each central wavelength is corresponding to a different grating rotation angle, so the central wavelength can be preset by fixing the grating rotation angle in advance), thus the wavelength accuracy can be fixed for each wavelength band.

Based on the same inventive concept, the embodiments of the present disclosure further provide a grating rotating apparatus for improving spectrograph wavelength accuracy, which can implement the method described in the above embodiments, as will be described in the following embodiments. Since the principle of the grating rotating apparatus for improving spectrograph wavelength accuracy to solve the problem is similar to that of the grating rotating method for improving spectrograph wavelength accuracy, please refer to the implementation of the grating rotating method for improving spectrograph wavelength accuracy for the implementation of the grating rotating apparatus for improving spectrograph wavelength accuracy, and the repeated content will be omitted. As used below, the term 'unit' or 'module' may be a combination of software and/or hardware that implements a predetermined function. Although the system described in the following embodiments is preferably implemented by software, implementation of hardware, or a combination of software and hardware, is also possible and contemplated.

Figure 4:
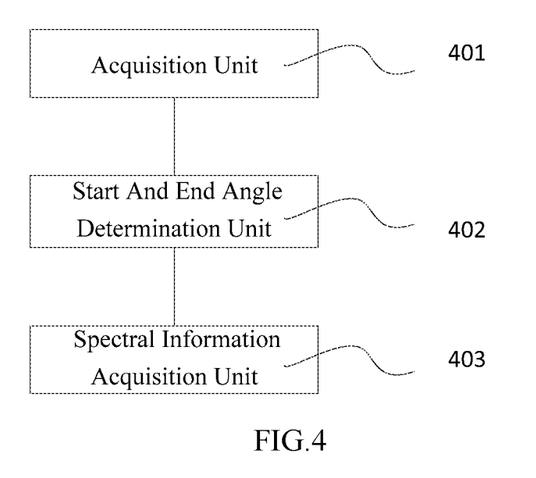
FIG. 4 is a structural block diagram of a grating rotating apparatus for improving spectrograph wavelength accuracy provided by the present disclosure.

As illustrated in FIG. 4, the present disclosure provides a grating rotating apparatus for improving spectrograph wavelength accuracy, comprising:

an acquisition unit 401 configured to acquire a start wavelength and an end wavelength of a scanning range;

a start and end angle determination unit 402 configured to determine a start angle and an end angle of a grating rotation according to preset grating rotation angle series values, the start wavelength and the end wavelength, wherein a wavelength corresponding to the start angle is smaller than the start wavelength, and a wavelength corresponding to the end angle is larger than the end wavelength; and a spectral information acquisition unit 403 configured to rotate the grating according to the start angle and the end angle to obtain required spectral information.

Figure 5:
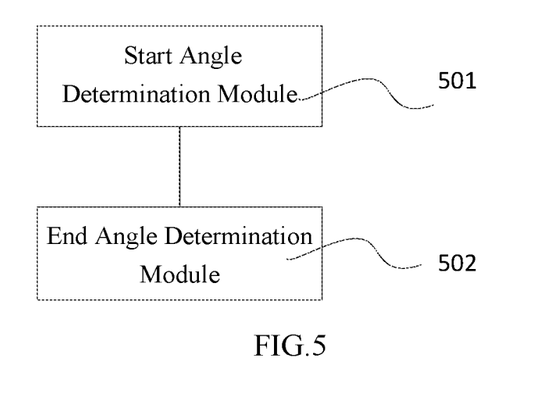
FIG. 5 is a structural block diagram of a start and end angle determination unit in an embodiment of the present disclosure.

In one embodiment, as illustrated in FIG. 5, the start and end angle determination unit 402 comprises:

a start angle determination module 501 configured to determine a first wavelength smaller than and closest to the start wavelength among wavelengths corresponding to the preset grating rotation angle series values, wherein an angle corresponding to the first wavelength is the start angle; and an end angle determination module 502 configured to determine a second wavelength larger than and closest to the end wavelength among the wavelengths corresponding to the preset grating rotation angle series values, wherein an angle corresponding to the second wavelength is the end angle.

Figure 6:
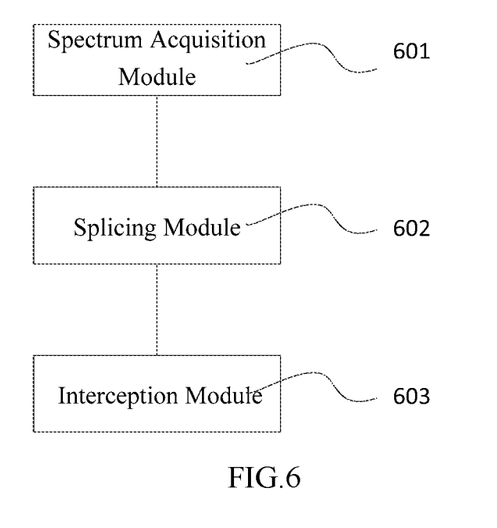
FIG. 6 is a structural block diagram of a spectral information acquisition unit in an embodiment of the present disclosure.

In one embodiment, as illustrated in FIG. 6, the spectral information acquisition unit 403 comprises:

a spectrum acquisition module 601 configured to rotate the grating from the start angle to the end angle to acquire spectra at a plurality of rotation angles;

a splicing module 602 configured to splice all the spectra to obtain full-range spectral information; and an interception module 603 configured to intercept required spectral information from the full-range spectral information according to the start wavelength and the end wavelength.

In one embodiment, means for presetting the grating rotation angle series values comprise:

an angle series values setting module configured to preset the grating rotation angle series values according to index attributes of the grating and a spectral capture wavelength width of an array detector; among the grating rotation angle series values, spectral ranges photographed by the array detector have an overlapped area at two adjacent grating rotation angle values.

In one embodiment, the grating rotating apparatus further comprises:

a mapping relation generation unit configured to test wavelengths corresponding to different grating rotation angles, and generate a mapping relation table of the grating rotation angles and the corresponding wavelengths.

Compared with the prior arts, the grating rotation method provided in the present disclosure is advantageous in that under the grating rotation scanning scheme provided in the present disclosure, the grating rotation angle is always fixed regardless of the initial scanning wavelength set by the user, and under different scanning ranges, each determined wavelength is corresponding to a determined grating rotation angle, so that the wavelength accuracy of each wavelength is fixed, without causing the problem in the prior arts that due to the low wavelength accuracy, the wavelength error of each band cannot be fixed and the finally obtained spectral information is inaccurate.

An embodiment of the present disclosure further provides an electronic device, which may be a desktop computer, a tablet computer, a mobile terminal, etc., and this embodiment is not limited thereto. In this embodiment, for the electronic device, please refer to the implementation of the method of FIG. 1 and the device of FIG. 4, the contents of which are incorporated herein and will not be repeated.

Figure 7:
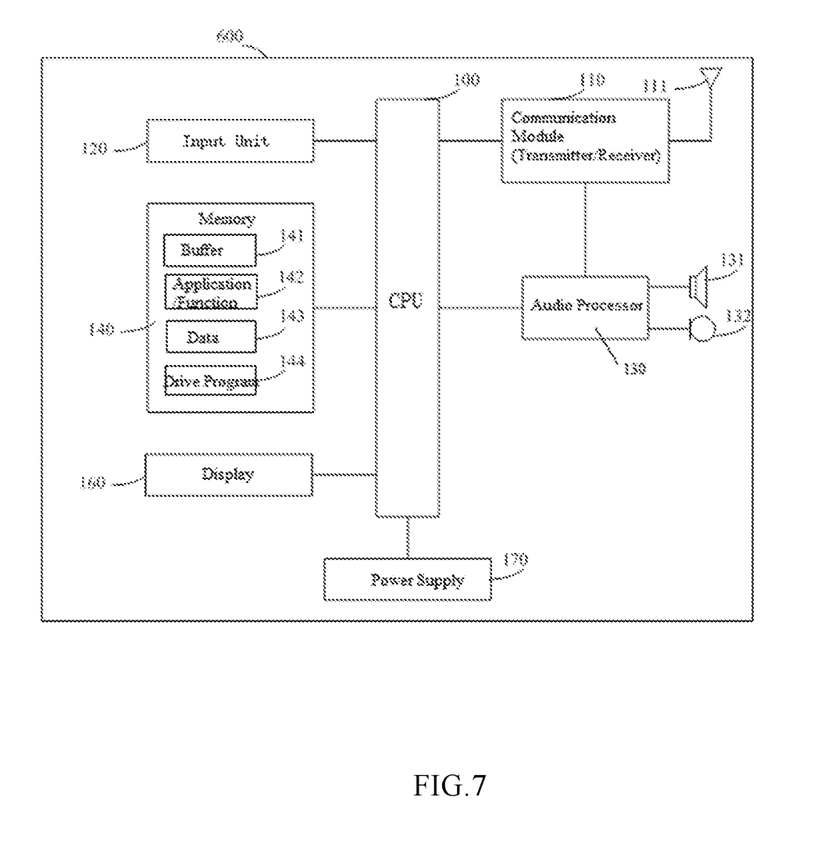
FIG. 7 is a schematic block diagram of a system configuration of an electronic device 700 in an embodiment of the present disclosure.

FIG. 7 is a schematic block diagram of a system configuration of an electronic device 700 according to an embodiment of the present disclosure. As illustrated in FIG. 7, the electronic device 700 may comprise a central processing unit (CPU) 100 and a memory 140 that is coupled to CPU 100. It should be noted that FIG. 7 is exemplary, and any other type of structure can be used to supplement or replace the illustrated structure, so as to realize the telecommunication function or other functions.

In one embodiment, the grating rotation method for improving spectrograph wavelength accuracy provided by the present disclosure can be integrated into the CPU 100, wherein the CPU 100 may be configured to perform the following controls:

S101: acquiring a start wavelength and an end wavelength of a scanning range.

S102: determining a start angle and an end angle of a grating rotation according to preset grating rotation angle series values, the start wavelength and the end wavelength, wherein a wavelength corresponding to the start angle is smaller than the start wavelength, and a wavelength corresponding to the end angle is larger than the end wavelength.

S103: rotating the grating according to the start angle and the end angle to obtain required spectral information.

In which, determining a start angle and an end angle of a grating rotation according to preset grating rotation angle series values, the start wavelength and the end wavelength comprises: determining a first wavelength smaller than and closest to the start wavelength among wavelengths corresponding to the preset grating rotation angle series values, wherein an angle corresponding to the first wavelength is the start angle; and determining a second wavelength larger than and closest to the end wavelength among the wavelengths corresponding to the preset grating rotation angle series values, wherein an angle corresponding to the second wavelength is the end angle.

In which, rotating the grating according to the start angle and the end angle to obtain required spectral information comprises: rotating the grating from the start angle to the end angle to acquire spectra at a plurality of rotation angles; splicing all the spectra to obtain full-range spectral information; and intercepting required spectral information from the full-range spectral information according to the start wavelength and the end wavelength.

In another embodiment, the grating rotating apparatus for improving the spectrograph wavelength accuracy can be configured separately from the CPU 100. For example, the grating rotating apparatus for improving the spectrograph wavelength accuracy can be configured as a chip connected to the CPU 100, and the grating rotation function for improving the spectrograph wavelength accuracy can be realized under the control of the CPU.

As illustrated in FIG. 7, the electronic device 700 may further comprise a communication module 110, an input unit 120, an audio processor 130, a display 160, and a power supply 170. It should be noted that the electronic device 700 does not necessarily comprise all the components illustrated in FIG. 7. In addition, the electronic device 700 may further comprise other components not illustrated in FIG. 7, please refer to the prior arts.

As illustrated in FIG. 7, the CPU 100, sometimes also referred to as a controller or operation control, may comprise a microprocessor or other processor device and/or logic device. The CPU 100 receives an input and controls operations of the components of the electronic device 600.

In which, the memory 140 may be, for example, one or more of a buffer, a flash memory, a hard drive, a removable medium, a volatile memory, a non-volatile memory, or any other suitable device. The memory may store the device-related information, and a program for executing relevant information. In addition, the CPU 100 may execute the program stored in the memory 140 to realize information storage or processing.

The input unit 120 provides an input to the CPU 100. The input unit 120 is, for example, a key or touch input means. The power supply 170 is configured to supply power to the electronic device 600. The display 160 is configured to display objects to be displayed, such as images and texts. The display may be, for example, an LCD display, but is not limited thereto.

The memory 140 may be a solid-state memory, such as a read only memory (ROM), a random access memory (RAM), an SIM card, etc. The memory 140 may also be such a memory that holds information even when power is off, can be selectively erased, and is provided with more data. An example of the memory is sometimes referred to as EPROM or the like. The memory 140 may also be a certain device of other type. The memory 140 comprises a buffer memory 141 (sometimes referred to as a buffer). The memory 140 may comprise an application/function storage 142 configured to store an application program, a functional program or a flow for executing operations of the electronic device 700 by the CPU 100.

The memory 140 may further comprise a data storage 143 configured to store data such as contacts, digital data, pictures, sounds, and/or any other data used by the electronic device. A drive program storage 144 of the memory 140 may comprise various drive programs of the electronic device for a communication function and/or for performing other functions of the electronic device (e.g., a messaging application, an address book application, etc.).

The communication module 110 is a transmitter/receiver 110 that transmits and receives signals via an antenna 111. The communication module (transmitter/receiver) 110 is coupled to the CPU 100 to provide an input signal and receive an output signal, which may be the same as the situation of a conventional mobile communication terminal.

Based on different communication technologies, a same electronic device may be provided with a plurality of communication modules 110, such as a cellular network module, a Bluetooth module, and/or a wireless local area network module. The communication module (transmitter/receiver) 110 is further coupled to a speaker 131 and a microphone 132 via an audio processor 130, to provide an audio output via the speaker 131 and receive an audio input from the microphone 132, thereby realizing the normal telecommunication function. The audio processor 130 may comprise any suitable buffer, decoder, amplifier, etc. In addition, the audio processor 130 is further coupled to the CPU 100, so that sound can be recorded in the machine through the microphone 132, and the sound stored in the machine can be played through the speaker 131.

The preferred embodiments of the present disclosure have been described above with reference to the drawings. Many features and advantages of these embodiments are clear from the detailed specification, and the appended claims are intended to cover all such features and advantages of these embodiments which fall within the true spirit and scope thereof. In addition, since many modifications and changes are easily conceivable for those skilled in the art, it is not intended to limit the embodiments of the present disclosure to the precise structures and operations illustrated and described, and instead, all suitable modifications and equivalents falling within the scope thereof may be covered.

In the present disclosure, specific examples are employed to explain the principle and implementation of the present disclosure. The descriptions of the above embodiments are only used to help the understanding of the method of the present disclosure and the core ideas thereof. Meanwhile, for those skilled in the art, there may be changes in the specific implementation and application scope according to the ideas of the present disclosure. To sum up, the content of this specification should not be construed as limitations to the present disclosure.

What is claimed is:

1. A grating rotation method for improving spectrograph wavelength accuracy, comprising:
    acquiring a start wavelength and an end wavelength of a scanning range;
    determining a start angle and an end angle of a grating rotation according to preset grating rotation angle series values, the start wavelength and the end wavelength, wherein a wavelength corresponding to the start angle is smaller than the start wavelength, and a wavelength corresponding to the end angle is larger than the end wavelength; and
    rotating the grating according to the start angle and the end angle to obtain required spectral information.

2. The grating rotation method according to claim 1, wherein determining a start angle and an end angle of a grating rotation according to preset grating rotation angle series values, the start wavelength and the end wavelength comprises:
    determining a first wavelength smaller than and closest to the start wavelength among wavelengths corresponding to the preset grating rotation angle series values, wherein an angle corresponding to the first wavelength is the start angle;
    determining a second wavelength larger than and closest to the end wavelength among the wavelengths corresponding to the preset grating rotation angle series values, wherein an angle corresponding to the second wavelength is the end angle.

3. The grating rotation method according to claim 1, wherein rotating the grating according to the start angle and the end angle to obtain required spectral information comprises:
    rotating the grating from the start angle to the end angle to acquire spectra at a plurality of rotation angles;
    splicing all the spectra to obtain full-range spectral information; and
    intercepting required spectral information from the full-range spectral information according to the start wavelength and the end wavelength.

4. The grating rotation method according to claim 1, wherein presetting the grating rotation angle series values comprises:
    presetting the grating rotation angle series values according to index attributes of the grating and a spectral capture wavelength width of an array detector, wherein among the grating rotation angle series values, spectral ranges photographed by the array detector have an overlapped area at two adjacent grating rotation angle values.

5. The grating rotation method according to claim 1, further comprising:
    testing wavelengths corresponding to different grating rotation angles, and generating a mapping relation table of the grating rotation angles and the corresponding wavelengths.

6. A grating rotating apparatus for improving spectrograph wavelength accuracy, comprising:
    a processor and a computer readable storage medium having instructions stored therein, wherein the instructions configure the processor to:
    acquire a start wavelength and an end wavelength of a scanning range;
    determine a start angle and an end angle of a grating rotation according to preset grating rotation angle series values, the start wavelength and the end wavelength, wherein a wavelength corresponding to the start angle is smaller than the start wavelength, and a wavelength corresponding to the end angle is larger than the end wavelength; and
    rotate the grating according to the start angle and the end angle to obtain required spectral information;
    a series of fixed grating rotation angle values are set according to different gratings and the spectral capture wavelength width of the array detector in the spectrograph;
    the spectrograph catch the start wavelength and the end wavelength.

7. The grating rotating apparatus according to claim 6, wherein the processor is further configured to:
    determine a first wavelength smaller than and closest to the start wavelength among wavelengths corresponding to the preset grating rotation angle series values, wherein an angle corresponding to the first wavelength is the start angle; and
    determine a second wavelength larger than and closest to the end wavelength among the wavelengths corresponding to the preset grating rotation angle series values, wherein an angle corresponding to the second wavelength is the end angle.

8. The grating rotating apparatus according to claim 6, wherein the processor is further configured to:
    rotate the grating from the start angle to the end angle to acquire spectra at a plurality of rotation angles;

splice all the spectra to obtain full-range spectral information; and intercept required spectral information from the full-range spectral information according to the start wavelength and the end wavelength.

9. The grating rotating apparatus according to claim 6, wherein the processor is further configured to:

preset the grating rotation angle series values according to index attributes of the grating and a spectral capture wavelength width of an array detector; wherein among the grating rotation angle series values, spectral ranges photographed by the array detector have an overlapped area at two adjacent grating rotation angle values.

10. The grating rotating apparatus according to claim 6, wherein the processor is further configured to:

test wavelengths corresponding to different grating rotation angles, and generate a mapping relation table of the grating rotation angles and the corresponding wavelengths.

11. An electronic device, comprising a memory, a processor, and a computer program stored in the memory and executable in the processor, wherein when the processor executes the computer program, the grating rotation method for improving spectrograph wavelength accuracy according to claim 1 is implemented.

12. A computer readable storage medium having a computer program stored therein, wherein when the computer program is executed by the processor, the grating rotation method for improving spectrograph wavelength accuracy according to claim 1 is implemented.

* * * * *